(12) United States Patent
Meise et al.

(10) Patent No.: US 6,389,185 B1
(45) Date of Patent: May 14, 2002

(54) LIGHT POLARIZATION TRANSFORMER

(75) Inventors: William H. Meise, Penns Park; Harvey L. Wagner, Macungie; Thomas W. Karras, Berwyn, all of PA (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/755,112

(22) Filed: Jan. 8, 2001

(51) Int. Cl.$^7$ ................................. G02B 6/00
(52) U.S. Cl. ................... 385/11; 359/256; 356/369
(58) Field of Search ................... 356/369, 491, 356/632; 359/487, 584, 259, 256; 372/106, 99; 385/10–13, 147, 88–90

(56) References Cited

U.S. PATENT DOCUMENTS

| | | | | |
|---|---|---|---|---|
| 3,684,350 A | * | 8/1972 | Wentz | 359/256 |
| 4,084,883 A | * | 4/1978 | Eastman et al. | 359/487 |
| 5,798,837 A | * | 8/1998 | Aspnes et al. | 356/369 |

* cited by examiner

*Primary Examiner*—Akm E. Ullah
(74) *Attorney, Agent, or Firm*—Swidler Berlin Shereff Friedman, LLP (57) ABSTRACT

An optical fiber that transforms light of undesired polarization into light of desired polarization. In principle, the signal power of the non-preferred polarization is transformed into signal power of the preferred polarization, thereby actually transforming the polarization. The fiber can have a circular end for input of light having randomly phased polarization, and an elongated end for output of light having a single principal orientation component. A generally smooth transition from the circular end to the elongated end causes substantially all the light entering the fiber to exit from the fiber without losing light due to reflection or radiation. Alternatively, the fiber can have a lobed end, for input of light having first and second mutually orthogonal polarization components, and an elongated end, for output of light having a single principal orientation component. Alternatively, the fiber can be a combination of the two forms described above. That is, the fiber can have a circular section that transforms first into a lobed section with increasing distance from the input port, with the lobed section then transforms into an elongated (e.g., elliptical or ovoid) section with increasing distance from the input port.

15 Claims, 7 Drawing Sheets

LIGHT POLARIZATION TRANSFORMER

BACKGROUND OF THE INVENTION

1. Field of the Invention

This invention relates to light signal processing systems, and more particularly to arrangements for converting one polarization of light into another.

2. Description of the Related Art

Light sources tend to emit randomly oriented, unpolarized light. Many types of light processing devices are polarization-sensitive, requiring placement of a polarization filter between the light source and the device for operation in the intended mode. This inevitably results in loss of half of the power from the light source, namely that portion of the light power that is in the non-preferred polarization. The lost light power goes into heating losses and often reduces system signal-to-noise and/or efficiency.

One way to recover the energy in the non-preferred polarization is to pass the preferred polarization through a polarizing filter and reflect the non-preferred polarization. The reflected polarization is then rotated to the desired polarization using any type of rotator, which may be a crystal rotator, and summed with the preferred polarization component which passed through the polarizing filter. This may be difficult to achieve, since any phase shift will tend to result in cancellation of the signals being combined.

Thus, what is needed is an improved light polarization transformer.

SUMMARY OF THE INVENTION

According to the invention, the randomly phased light source is applied to one end of a polarization-converting optical fiber, and the preferred polarization is extracted from the other end of the fiber. The signal power at the output end of the polarization converter is ideally exactly equal to that at the input end, but of course the actual power will depend on the through loss of the device. In principle, the signal power of the non-preferred polarization is transformed into signal power of the preferred polarization, thereby actually transforming the polarization.

In a preferred embodiment, the fiber of the present invention has a circular end, for input of light having randomly phased polarization, and an elongated end, for output of light having a single principal orientation component. A generally smooth transition from the circular end to the elongated end causes substantially all the light entering the fiber to exit from the fiber without losing light due to reflection or radiation. Thus, light propagating through the fiber is transformed from randomly oriented, unpolarized light into light having a single principal polarization component.

Alternatively, the fiber can have a lobed end, for input of light having first and second mutually orthogonal polarization components, and an elongated end, for output of light having a single principal orientation component. As light propagates through the fiber, the light is transformed from light having mutually orthogonal components into light having a single principal polarization component.

Alternatively, the fiber can be a combination of the two forms described above. That is, the fiber can have a circular section that transforms first into a lobed section with increasing distance from the input port, with the lobed section then transforming into an elongated (e.g., elliptical or ovoid) section with increasing distance from the input port.

Such fibers provide a low-cost and effective device for transforming undesired light polarization into one or more desired polarizations.

BRIEF DESCRIPTION OF THE DRAWINGS

The present invention is described with reference to the accompanying drawings, in which like reference characters reference like elements, and wherein.

DETAILED DESCRIPTION OF THE INVENTION

Figure 1A:
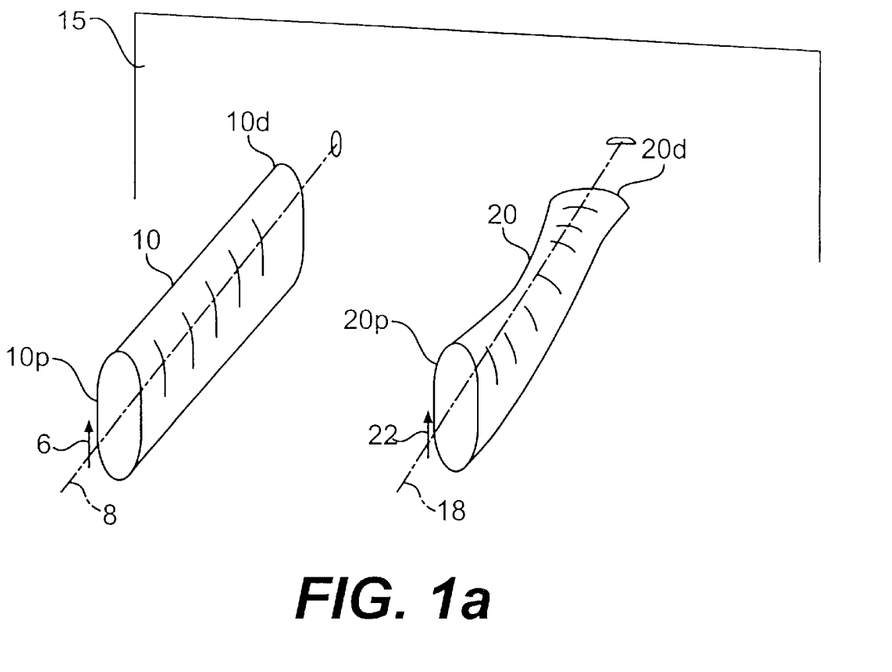
FIGS. 1a, 1b and 1c are illustrations of the principle behind the optical fiber of the present invention.
Figure 1B:
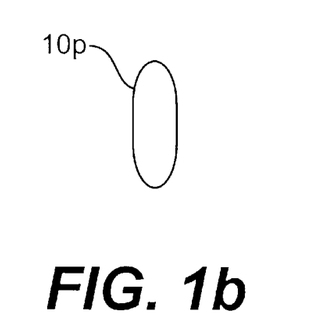

The invention can be understood by noting the properties of the optical fibers of FIG. 1a. In FIG. 1a, an optical fiber 10 is elongated along an axis of elongation 8, and has a constant cross-section at all points along its length. The cross-section defines a generally elongated oval or ellipse. The principal or main diameter of the elliptical or oval cross-section of fiber 10 is illustrated as being vertically oriented along its entire length, as illustrated in FIG. 1b, and the fiber 10 thus preferentially propagates light applied to its proximal end 10p, which is vertically oriented, as suggested by arrow 6. Vertically polarized light introduced into the proximal end 10p of fiber 10 propagates in known fashion to the remote or distal end 10d of the fiber, and leaves fiber 10 at distal end 10d. The light leaving distal end 10d is illustrated as forming an illuminated dot on a hypothetical "screen" 15.

Figure 1C:
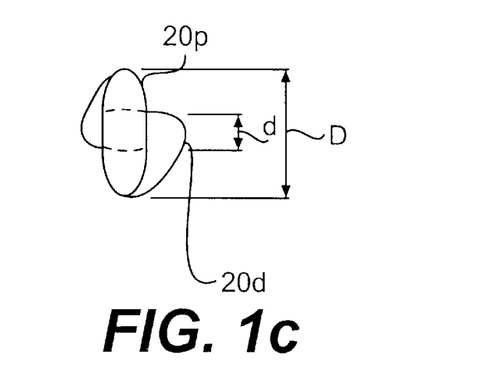

In FIG. 1a, a further optical fiber 20 elongated along an axis of elongation 18 defines a proximal end 20p and a distal end 20d. Optical fiber 20 also has a generally oval or elliptical cross-section similar to that of fiber 10. Unlike fiber 10, however, fiber 20 is twisted along its length so that the axis of elongation of the cross-section is vertical at the proximal end 20p and horizontal at the distal end 20d. Simplistic analysis might assume that vertically oriented light illustrated as 22 introduced into proximal end 20p of fiber 20 would not propagate through the fiber. Such an analysis might be based upon the distal end view of FIG. 1c, in which it can be observed that the cross-sectional dimensions of the optical fiber are D at proximal end 20p, but only d at distal end 20d. It might be thought that this reduction in principal dimension from D to d would cause the light introduced at proximal end 20p to be reflected, or possibly radiated along the length of optical fiber 20, so that little or no light would arrive at distal end 20d. However, those skilled in the art know that the light "follows" the optical fiber notwithstanding that the fiber may twist and turn. But it is true that a sharp turn or discontinuity will cause light to reflect or radiate at the location of the discontinuity.

In considering why the light "follows" optical fiber 20, one may be led to consider that a known effect in optics is that of the antireflection coating. An antireflection coating includes one or more layers of transparent material over the surface of an optical element, such as a camera lens, which aids in reducing reflections at the surface that arise due to the differences between the indices of refraction of the materials on either side of the surface. A simple version of such a coating may take the form of a layer having a thickness of one-quarter wavelength at the frequency of the light traversing the surface. The index of refraction of the coating is selected so that the magnitude of the reflection between the coating and free space is of generally the same magnitude as the magnitude of the reflection between the lens and the coating. The thickness of the coating, namely one-quarter wavelength, is such that, for light propagating in a particular direction, the reflections are out-of-phase and therefore tend to cancel.

In the art of transmission lines for electromagnetic signals, a similar reflection occurs at locations where the impedance of the transmission line changes. In this art, there is a known type of "impedance transformer" which performs the same type of cancellation of reflections at the frequency of operation. Such an impedance transformer includes one or more additional step changes in the transmission line impedance. Such steps are spaced apart by a distance, and are of such a magnitude, that the various spaced-apart reflections tend to cancel, at least over a band of frequencies. Among the types of impedance transformers used for transmission lines is the "tapered" transmission-line transformer. These may take several forms, one of which is discrete capacitors and inductors formed into a transmission line, with the values selected so that the characteristic impedance of the transmission line changes along its length to match the impedances of the source and load. Another form that the tapered transmission line transformer may take is that of a coaxial cable (coax), in which the center conductor extends from one end of the transformer to the other, but in which the outer conductor is cut away progressively toward the higher-impedance end so that at the higher-impedance end the transmission line takes the form of a two-wire line rather than that of a coax. The tapered forms of transmission-line transformers tend to have much greater bandwidth than those based on a discrete number of step transitions. That is to say, the reflections from such a tapered transmission line transformer tend to be smaller or reduced, over a greater bandwidth, than the reflections of a discrete transformer.

Analogizing the propagation of polarized light in an oval or elliptical optical fiber to the propagation of electromagnetic energy in a transmission line, one might conclude that the reason that the light follows the fiber is that, so long as the curvature or twist of the fiber is very small per unit wavelength, reflections do in fact occur that are attributable to the incremental change in dimension of the fiber in the direction of the polarization vector of the light propagating therein, but that these reflections tend to cancel. The same type of action may be attributable to radiation of light along the length of the fiber; it does occur, but the incremental radiation at any location is cancelled by out-of-phase radiation from other locations on the fiber. The case of the reflections is easier to understand. Imagine a location at the wall of an optical fiber, where the wall is curved, but in which the curvature is such as to occur over thousands of wavelengths of the light. A reflection having a magnitude and a phase will occur at that selected location. However, for any such location, there is an essentially identical second location spaced one-quarter wave away, which has a reflection of the same magnitude (since the curvature is essentially constant), but which is of a phase that tends to cancel the reflection at the first location. Since each and every point along the curve is associated with another such point that produces a canceling reflection, essentially all reflections are canceled. If all reflections cancel, no energy can be returned to the source, so the light must either propagate through the fiber or be lost by radiation. Analysis of radiation is performed in a similar manner, although it is conceptually a bit more difficult to understand, because velocities of propagation of light inside the fiber and outside the fiber differ. Nevertheless, for each radiating location on the outer surface of the curved fiber, there is another virtually identical location spaced one-quarter wave away along the fiber. The "far-field" or radiation pattern of such a "line array" of randomly phased "point" sources is equivalent to the summation of all possible phases of unit magnitude, and tends toward zero. Thus, the optical fiber neither radiates nor reflects, so long as the curve is gentle. Since there is neither reflection nor radiation, the light remains within the fiber or "follows" the fiber.

Figures 2, 2A, 2B, 2C, 2D:
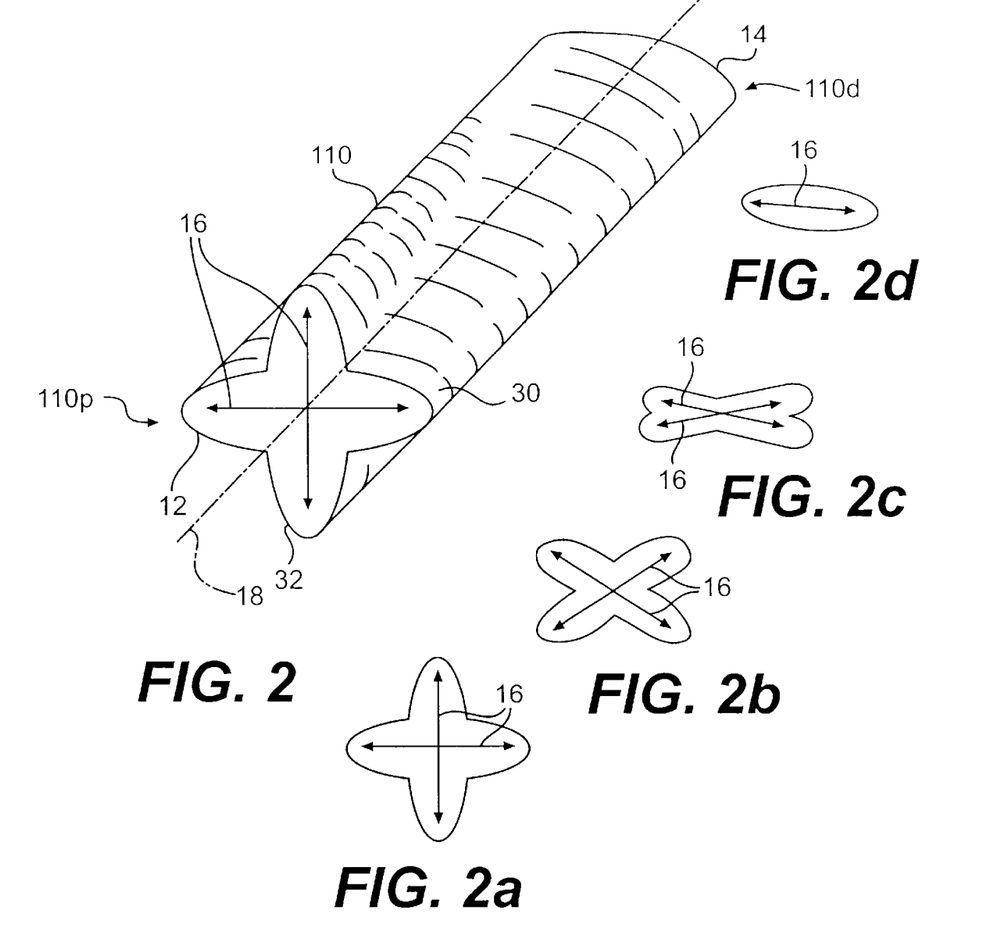
FIG. 2 shows an embodiment of the optical fiber of the present invention.
FIGS. 2a, 2b, 2c and 2d show cross-sections of the fiber of FIG. 2 at various lengths along the longitudinal axis.
Figure 2E:
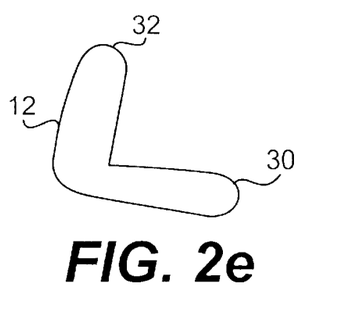
FIG. 2e shows an alternate embodiment of the input port of the fiber of FIG. 2.

With the preceding analysis, we may now consider the structure of FIG. 2. In FIG. 2, the two fibers 10 and 20 of FIG. 1a are superimposed or combined into a single optical fiber 110. Fiber 110 has a horizontal lobe 30 and a rotational lobe 32. Horizontal lobe 30 extends from proximal end 110p to distal end 110d with a constant cross-section. Rotational lobe 32, like fiber 20 of FIG. 1, extends from a vertical orientation at proximal end 110p to a horizontal orientation at distal end 110d. FIGS. 2a, 2b, 2c and 2d show cross-sections of fiber 110 taken at various lengths along axis 18. Light 16 enters fiber 110 at input port 12. It is seen that light 16 at input port 12 contains mutually orthogonal polarization components. Rotational lobe 32 is gradually rotated or twisted toward horizontal lobe 30 with increasing distance from proximal end 110p. By rotating lobe 32 over the span of several wavelengths, as previously discussed, light 16 follows the rotation of lobe 32 and exits at output port 14 having a single principal polarization component, which is the horizontal component of light 16 at input port 12, without reflection or radiation. That is, the electrical vector of light 16 exiting fiber 110 through output port 14 is parallel with the axis of elongation of outlet port 14. Output port 14 can take any desired shape, with an elliptical or ovoid shape being preferred. As seen in FIG. 2e, lobes 30, 32 can also be arranged asymmetrically.

Figures 3, 3A, 3B, 3C, 3D:
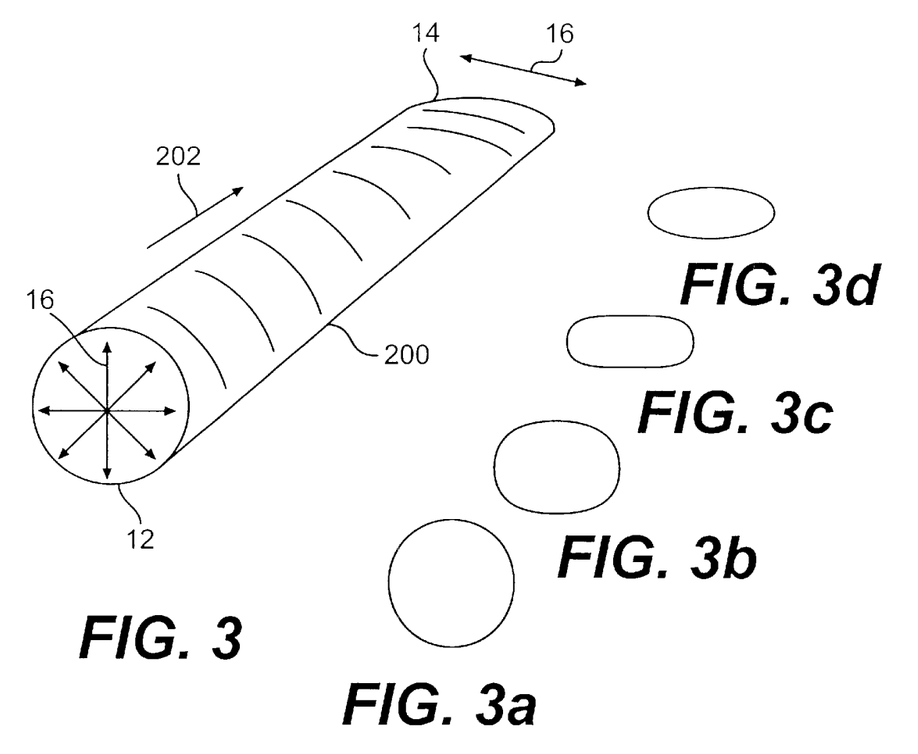
FIG. 3 shows another embodiment of the optical fiber of the present invention.
FIGS. 3a, 3b, 3c and 3d show cross-sections of the fiber of FIG. 3 at various lengths along the longitudinal axis.

FIG. 3 shows another embodiment of an optical fiber 200. Here, randomly phased light 16 enters fiber 200 at input port 12, which has a circular cross-section. The circular cross-section can be thought of as the lobed cross-section of input port 12 of fiber 110, but with the spaces between lobes 30, 32 "filled in." As light 16 propagates through fiber 200 in the direction indicated by arrow 202, the light 16 is transformed into light having a single principal polarization component. This is achieved similarly as with respect to fiber 110 discussed above. The cross section of fiber 200 is gradually transformed from circular at input port 12 to an elongated form at exit port 14. This gradual transformation is illustrated in FIGS. 3a, 3b, 3c and 3d, which show cross-sections of fiber 200 at various lengths along the longitudinal axis. Light 16 follows the cross-sectional transformation and exits fiber 200 at output port 14 having a single principal polarization component. Although the exit orientation is illustrated as being horizontal in FIG. 3, any desired orientation may be achieved.

Figure 4:
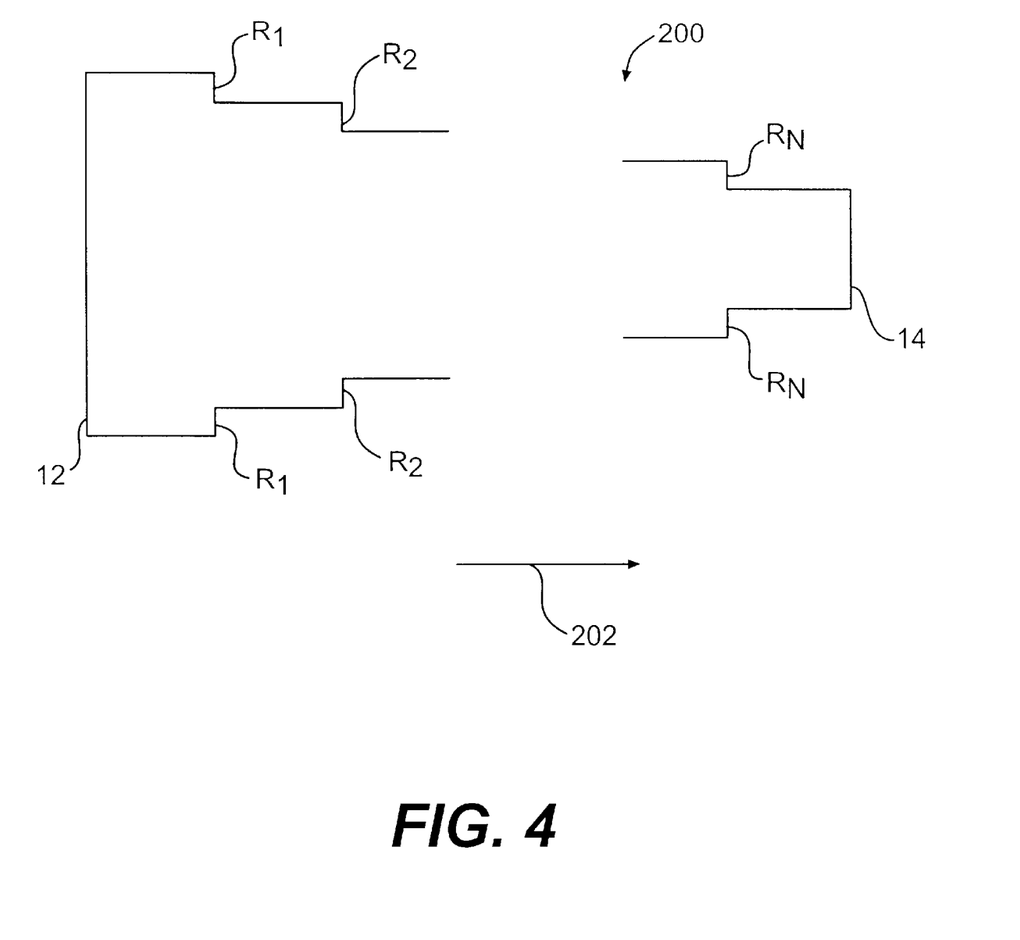
FIG. 4 shows a microscopic view of a portion of the fiber of FIG. 3.

FIG. 4 represents an elevation view of a microscopic portion of fiber 200, illustrating the taper in the transverse dimension as a plurality of discrete steps designated $R_1$, $R_2$, ... $R_N$, separated by infinitesimal incremental distances. As the vertical component of light 16 propagates from input port 12 to output port 14, light 16 encounters a miniscule reduction in transverse dimension at each incremental distance. This reduction of the transverse dimension is equivalent to a small change in the impedance of a transmission line, and in turn results in a minuscule reflection from the step. Consequently, the gradually tapered dimension may be viewed as generating an infinitely large number of reflections, each having about the same dimension as the ones in its vicinity, and each somewhat delayed or phase shifted relative to the others. When the number of these steps is large, these reflections, with their random phases and equal amplitudes, tend to add together and cancel. The continuous taper of fiber 200 (see FIG. 3) corresponds with an infinite number of infinitely small steps. Thus, energy propagated into input port 12 in the vertical orientation is not lost by way of reflection.

Figure 5:
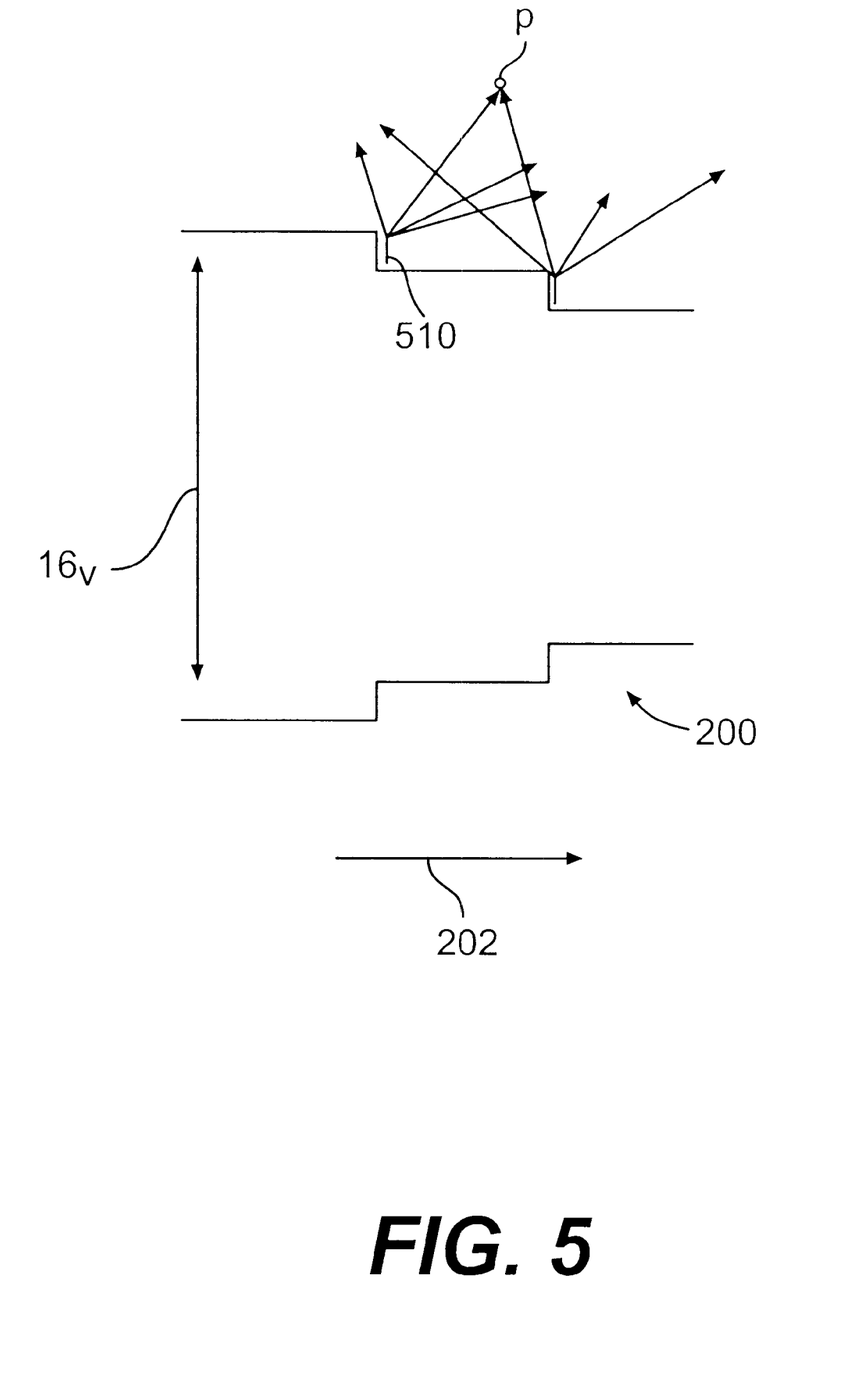
FIG. 5 shows a microscopic view of a portion of the fiber of FIG. 3.

FIG. 5 illustrates a small portion of the tapered-elliptical optical fiber 200, in which the vertically polarized light component $16_v$ propagates in a tapered dimension approximated by a series of steps. As illustrated, at the first step, a small component of the light signal represented by an arrow 510 is radiated in various directions. At any point P, the field strength is attributable to the radiation from all the steps along the length of the polarization transforming fiber 200. The radiation patterns of each of the steps will tend to be the same as that of the steps in its vicinity, and thus each point in space will tend to receive the same amount of radiated energy from steps which are near each other. Since the energy will tend to be distributed in phase, cancellation of the radiated fields will occur.

Figure 6:
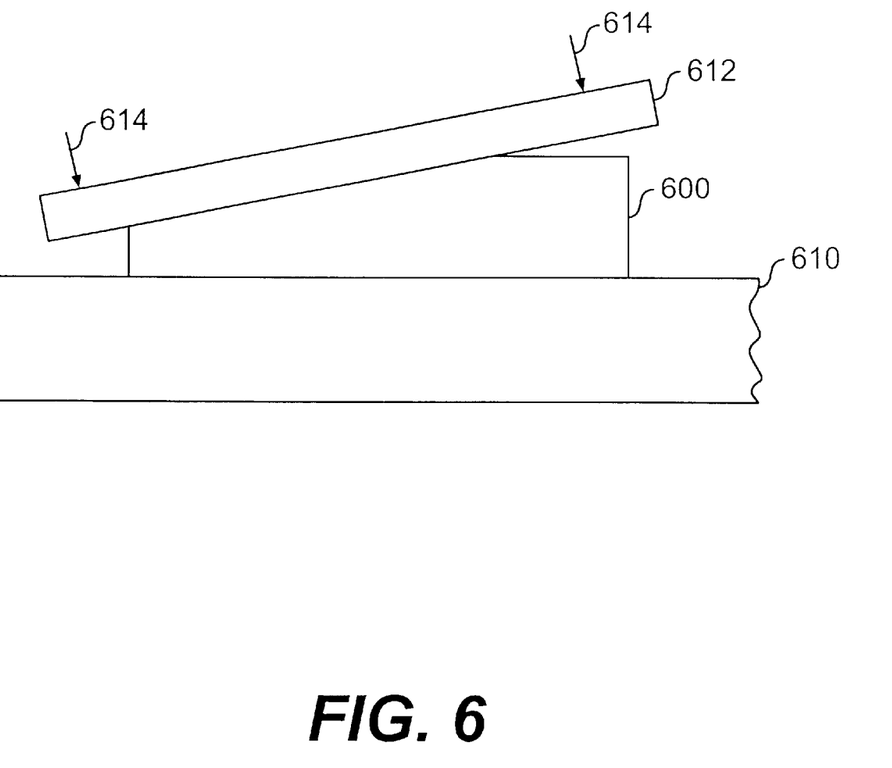
FIG. 6 illustrates a method of making the optical fiber of the present invention.

FIG. 6 illustrates a method of making a tapered elliptical optical fiber 600. For the purposes of explanation, a circular-to-elliptical transforming optical fiber is shown, but those of ordinary skill in the art will appreciate the same process, with minor modification, can be employed to create any desired form. Fiber 600 is maintained at a temperature at which it is soft or malleable. Fiber 600 sits on a flat plate 610, and a second flat plate 612 is pressed down at an angle, in the direction of arrows 614. Fiber 600 is then allowed to cool, either before or after removing plate 612.

Figure 7:
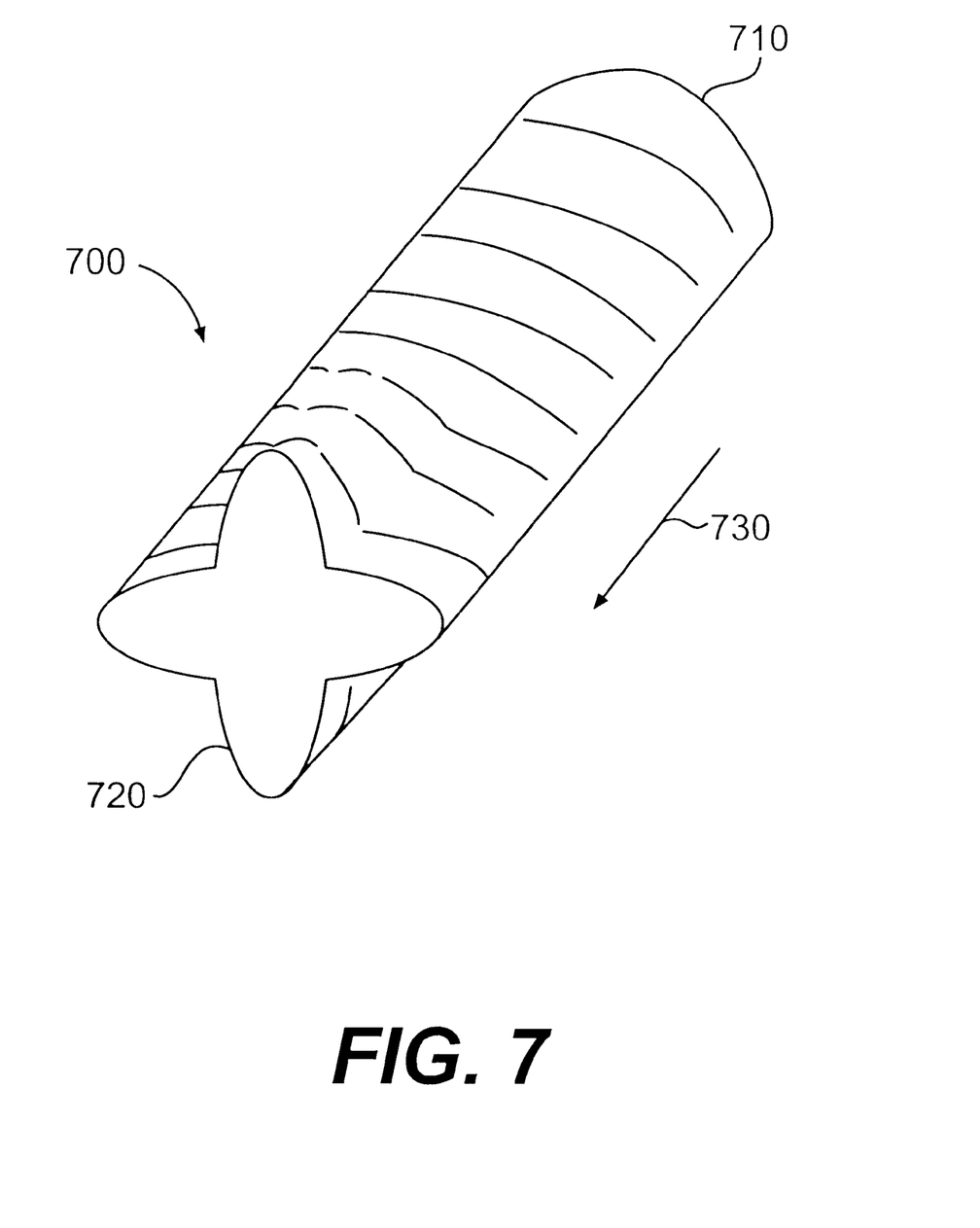
FIG. 7 shows another embodiment of the optical fiber of the present invention.

FIG. 7 shows another embodiment of optical fiber 700. This embodiment has a circular end 710 and an orthogonal end 720. Randomly phased light propagating through fiber 700 in the direction of arrow 730 is transformed as described above into light having two orthogonal components. Fiber 700 can be used in conjunction with fiber 110 of FIG. 2 by placing the fibers with the orthogonal ends facing each other. By adding or removing fiber 700, one can alter the polarization of the emitted light as needed.

While the preferred embodiments of the present invention have been described above, it should be understood that they have been presented by way of example only, and not of limitation. It will be apparent to persons skilled in the relevant art that various changes in form and detail can be made therein without departing from the spirit and scope of the invention. Thus the present invention should not be limited by the above-described exemplary embodiments, but should be defined only in accordance with the following claims and their equivalents.

What is claimed is:

1. A device for combining the power of light having first and second mutually orthogonal polarization components into light having a single principal polarization component, said device comprising:

an elongated optical fiber defining an output port and an input port capable of accepting light having two mutually orthogonal polarization components;

said optical fiber including an output region adjacent said output port which has an elongated cross-section so as to preferentially propagate a single polarization of light having its electrical vector component parallel with an axis of elongation of said cross-section;

said optical fiber also including a second region remote from said output port having a cross-section which is generally circular, said second region being for preferentially propagating first and second mutually orthogonal components of a light signal applied to said input port; and said optical fiber further including a polarization rotation region lying between said output region and said second region, said rotation region having cross-sections along its length which transition between said generally circular cross-section into said elongated cross-section adjacent said exit port.

2. The device of claim 1, wherein said rotation region has a length exceeding ten wavelengths of light.

3. The device of claim 1, wherein said elongated cross-section is elliptical.

4. The device of claim 1, wherein said elongated cross-section is ovoid.

5. A polarization-affecting device, comprising:

an elongated optical fiber defining input and output regions, said input region having a generally circular cross-section suitable for propagation of at least first and second mutually orthogonal polarizations of light, and said output region having a generally elongated cross-section suitable for preferential propagation of light having a polarization the electric vector of which is parallel to the direction of elongation of said elongated cross-section; and said elongated optical fiber including a region lying between said input and output regions in which a generally smooth transition of cross-section occurs for causing substantially all the light entering said input region to exit from said output region.

6. The device of claim 5, wherein said rotation region has a length exceeding ten wavelengths of light.

7. The device of claim 5, wherein said elongated cross-section is elliptical.

8. The device of claim 5, wherein said elongated cross-section is ovoid.

9. A device for combining the power of light having first and second mutually orthogonal polarization components into light having a single principal polarization component, said device comprising:

an elongated optical fiber defining an output port and an input port capable of accepting light having two mutually orthogonal polarization components;

said optical fiber including an output region adjacent said output port which has an elongated cross-section so as to preferentially propagate a single polarization of light having its electrical vector component parallel with the axis of elongation of said cross-section;

said optical fiber also including a second region remote from said output port having a cross-section which is lobed, said second region including at least first and second lobes having mutually orthogonal axes for preferentially propagating first and second mutually orthogonal components of a light signal applied to said input port; and said optical fiber further including a rotation region lying between said output region and said second region, said rotation region having cross-sections along its length in which said at least first and second lobes merge toward each other with increasing distance from said second region, with said first and second lobes combining into said elongated cross-section adjacent said exit port.

10. A device according to claim 9, wherein said rotation region has a length exceeding ten wavelengths of light.

11. A device according to claim 9, wherein said elongated cross-section is elliptical.

12. A device according to claim 9, wherein said elongated cross-section is ovoid.

13. A device according to claim 9, wherein said input port has a circular cross-section; and said optical fiber includes a further portion lying between said input port and said second region, said further portion of said optical fiber having cross-sections along its length in which said at least first and second lobes become less pronounced with increasing distance from said second region, so as to become circular adjacent said input port.

14. A device according to claim 9, wherein said at least first and second lobes in said second region are symmetrically disposed relative to a local axis of elongation of said optical fiber.

15. A device according to claim 9, wherein said at least first and second lobes in said second region are asymmetrically disposed relative to a local axis of elongation of said optical fiber.

* * * * *